A. G. PAXTON.
GRAIN AND SEED SEPARATOR.
APPLICATION FILED JULY 31, 1912.
1,054,605.
Patented Feb. 25, 1913.
3 SHEETS—SHEET 3.
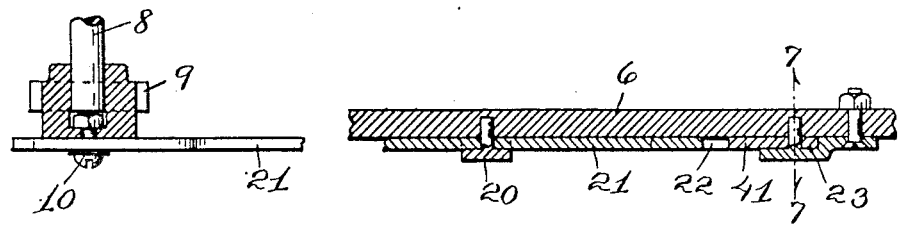
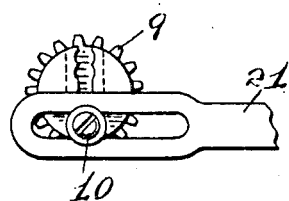
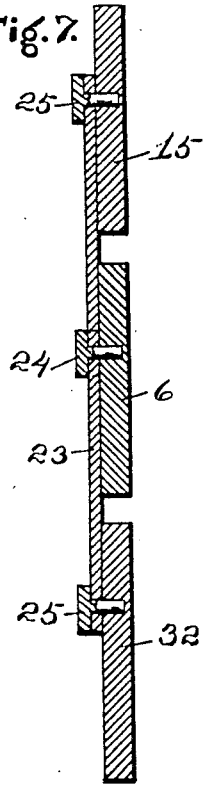
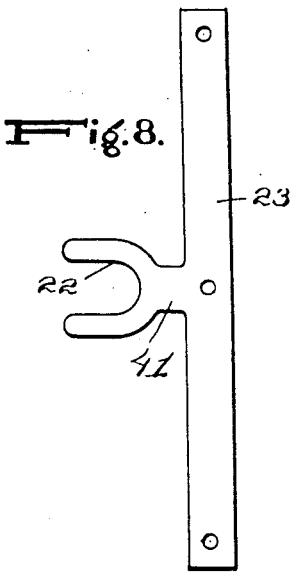
Witnesses
Stuart Hilder.
Frances W. Anderson.
Inventor
Alfred G. Paxton
by E. W. Anderson
his Attorneys

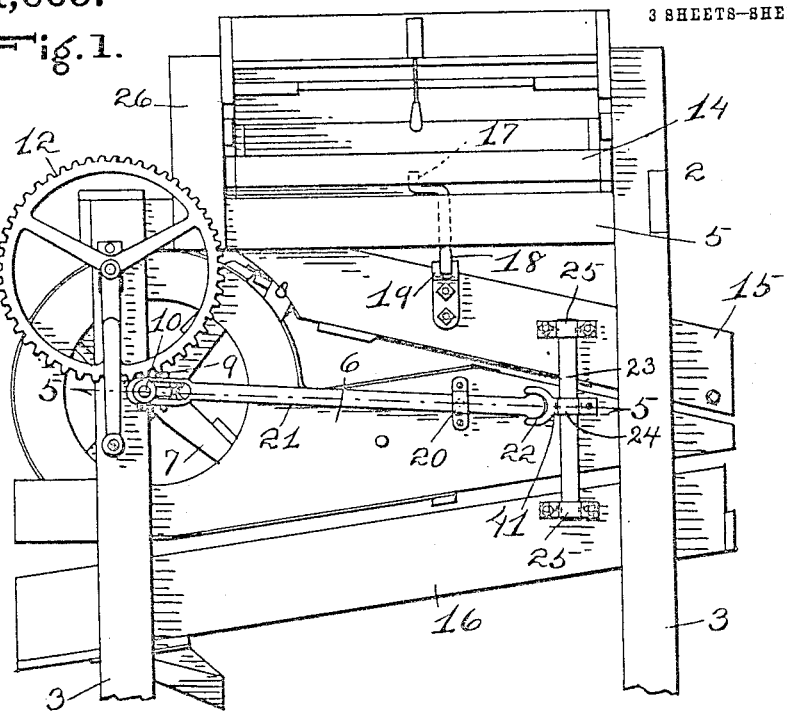

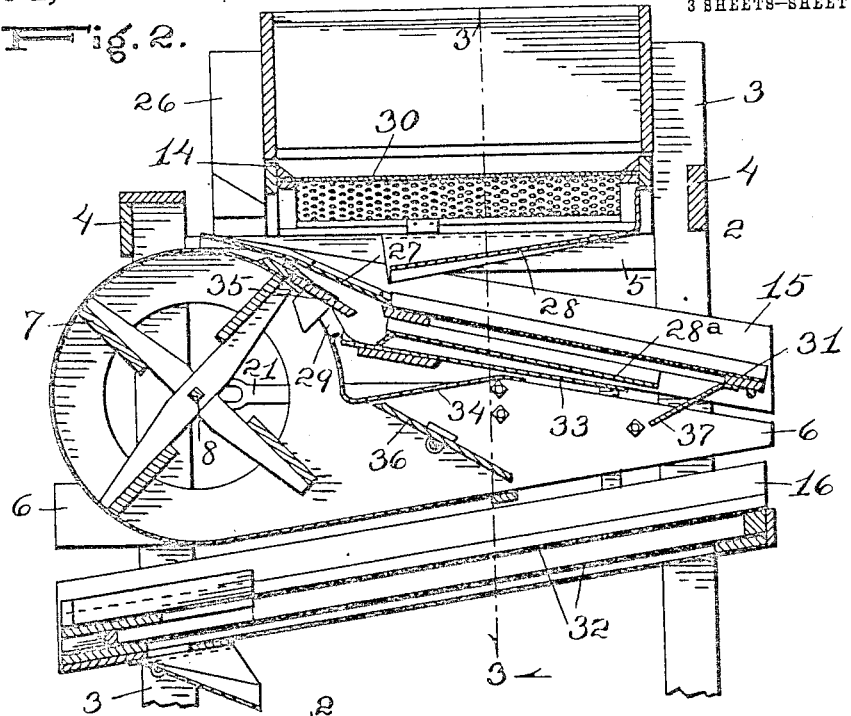
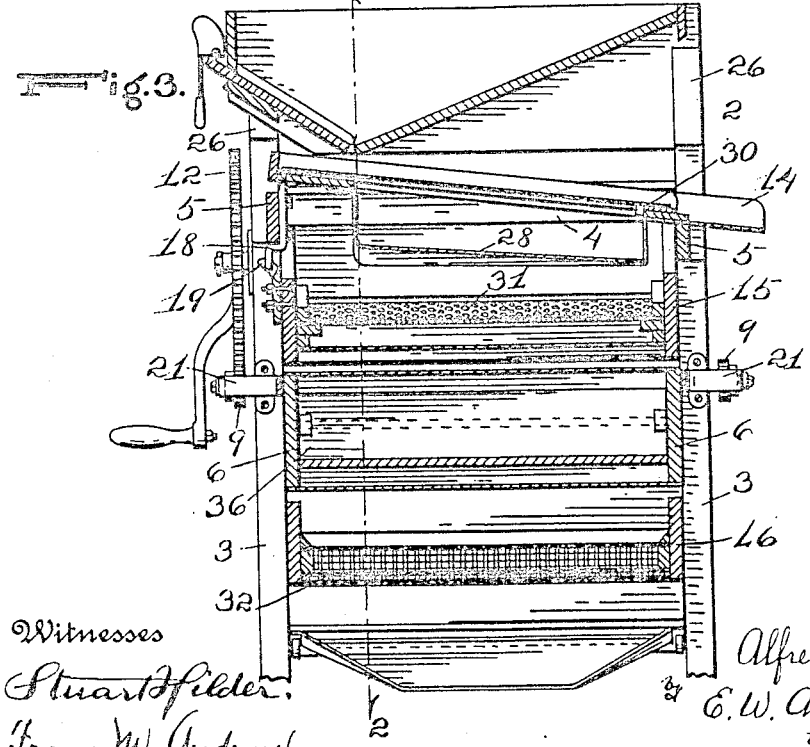

UNITED STATES PATENT OFFICE.

ALFRED G. PAXTON, OF DUBLIN, INDIANA.

GRAIN AND SEED SEPARATOR.

1,054,605.  Specification of Letters Patent.  Patented Feb. 25, 1913.

Application filed July 31, 1912. Serial No. 712,546.

*To all whom it may concern:*

Be it known that I, ALFRED G. PAXTON, a citizen of the United States, resident of Dublin, in the county of Wayne and State of Indiana, have made a certain new and useful Invention in Grain and Seed Separators; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of my separator. Fig. 2 is a section on the line 2—2, Fig. 3. Fig. 3 is a section on the line 3—3, Fig. 2. Fig. 4 is a section on the line 2—2, Fig. 3 with the upper screen removed and the hopper rearranged. Fig. 5 is a section on the line 5—5, Fig. 1, partly broken away. Fig. 6 is a detail face view of the adjustable wrist pin 1. Fig. 7 is a detail sectional view on the line 7—7, Fig. 5. Fig. 8 is a detail face view of the vertical lever.

The invention relates to improvements in grain and seed separators, regarding the hopper, the operating gear, the screens and the disposition of the air; and it consists in the novel construction and combinations of parts, as hereinafter described and claimed. In this machine an adjustable hopper is provided to facilitate operation in connection with different combinations of screens; also a removable upper shoe; simplified operating gear in connection with the shoes; means for special disposition of the air and other devices for improving the construction.

In the accompanying drawings, illustrating the invention, the numeral 2 indicates the frame of the machine, which is rectangular in its general shape, consisting mainly of uprights 3 connected by end or transverse bars 4, side bars 5 and the lateral boards of the fan casing 6, which are designed to extend lengthwise of the machine.

The fan is indicated at 7, provided with a shaft 8, to each end of which is attached a pinion 9 having an eccentric wrist pin 10. The drive wheel engaging the pinion 9 is indicated at 12.

The top shoe 14 carries the upper screen 30, and is removable. The middle shoe 15, carrying the second screen 31, becomes the upper shoe when the top shoe is removed. The bottom shoe 16 carries the lower or grading screens 32. The middle and bottom shoes are designed to have motion of vibration or reciprocation lengthwise the frame, the fan being arranged transversely at one end of said frame, above the bottom shoe. The upper shoe is designed to have vibratory motion transverse the frame. The sides of the middle and bottom shoes are in the same vertical plane, and the connected end of the top shoe is arranged over this plane and is provided with a central bearing 17 to engage the upright end of the horizontal upper crank of a double crank rod 18, which is seated in bearings of the higher lateral bar 5 of the frame. This double crank rod extends vertically, and its lower crank extends under the bar and has an angular relation to the upper crank of about ninety degrees. Its end extends downward and engages an open slot bearing piece 19 which is secured to the side of the middle shoe. When vibratory motion is given to the middle shoe lengthwise the frame the double crank rod transmits vibratory motion transverse the frame to the upper shoe. Below, on each side of the frame, is secured a bracket fulcrum piece 20, in which is pivoted a lever 21 which extends lengthwise the frame. The end of the long arm of this lever is slotted to engage the wrist pin of the pinion 9, which is slotted radially in order that the wrist pin may be adjusted to give more or less play to the shoes, as may be desired. For this purpose the slot is provided with inset margins, to serve as bearings for the wrist pin, which is threaded and provided with an inlet head or nut whereby it is clamped in position. The end of the short arm of this lever 21 is rounded to engage a rounded bearing 22 in the end of a short lateral arm 41 of a vertical lever 23, which is pivoted in a fulcrum piece 24 of the frame. The upper and lower ends of the vertical lever extend along the sides of the middle and bottom shoes, and engage horizontal bracket bearings 25 secured to said sides. When the drive wheel is turned the pinions of the fan shaft, by their wrist pins, operate the levers 21 on each side of the machine, and these levers, through the vertical levers 23 transmit vibratory motion to the middle and bottom shoes. At the same time motion is transmitted to the top shoe from the middle shoe through the double crank shaft. Slight adjustment of the wrist pins will cause marked variation in the movements of the middle and lower screens.

To the upper side bars 5, near the fan end of the frame, are secured short uprights 26, whose distance from the uprights 2 at the other end of the frame is equal to the distance of these uprights 2 from each other. These uprights are so arranged to provide for the adjustment of the hopper from lengthwise position to transverse position. The hopper in raised transverse position rests at one side upon bearings 26ª of the uprights 26 at this side, and at its opposite side the hopper side pieces are notched at 26ᵇ, the lower wall of the notches resting upon the tops of the uprights 26 at this side (see Fig. 3). In the lowered, longitudinally disposed position of the hopper it rests at one side upon bearings 26ᶜ of the uprights, and at its opposite side the lower walls of said notches rest upon transverse bars 4, connecting the uprights, (see Fig. 4).

The upper and removable screen shoe 14 is seated transversely in the frame and is provided with a screen 30 of proper gage for cleaning oats, and is designed to remove most of the chaff. It is provided underneath with a depending draft guide 28 having an inclined bottom, and opening toward the guide sheet 27 at the upper end of the middle screen, upon which it discharges. The other three sides of the draft guide are closed by vertical walls extending to the top shoe. When this shoe is in use the hopper is arranged transverse the frame, and discharges upon this oat screen. When this shoe is not required the hopper is lifted from its bearings and the transverse shoe is removed. Then the hopper is adjusted to lengthwise position and replaced in the machine on lower bearings, in such wise as to discharge upon the screen 31 of the second or middle shoe. Under the screen of this shoe is provided a sheet metal bottom 28ª, between which and the screen above it the air from the upper air duct or blast opening 29 in the fan case is designed to be forced, in order to cause chaff, sticks and other light waste stuff to be raised and drifted off the screen. The bottom 28ª is designed to be parallel to the screen, and its ends are brought close to an inclined guide sheet 33 which approximates the ends of the angular front guide sheet 34 of the fan case. The lower end of the screen 31 is provided with a downward and backward inclined guide 37.

The upper air duct 29 is provided with an adjustable valve board 35, and the lower air duct with an adjustable valve board 36. These valve boards are made capable of adjustment in order to regulate the air with reference to the air passages under the middle screen and above the grading screens.

When there is much chaff and light waste mixed with the grain the top shoe is used to shake the light matter off the transverse screen, the grain falling on its under guide, which is inclined transverse this screen, and discharging backward upon the upper guide sheet of the second screen, over which it passes, under the action of the blast from the upper fan duct, which is designed to practically complete the cleaning by drifting off the remaining chaff and light stuff. The blast can be regulated to act more or less at either end of this screen by means of the valve boards. From this screen the grain is discharged backward upon the grading screens of the bottom shoe.

Having described the invention, what I claim and desire to secure by Letters Patent is:

1. In a grain cleaner and separator, a frame, a lower longitudinally reciprocating screen shoe, a transversely reciprocating removable upper screen shoe, means for reciprocating the lower shoe, and means for reciprocating the upper shoe from the lower shoe.

2. In a grain cleaner and separator, a removable transversely reciprocating upper screen shoe, a middle longitudinally reciprocating screen shoe below the upper shoe, a lower longitudinally reciprocating grading screen shoe below the middle shoe, a hopper normally delivering to the upper shoe and having adjustment vertically and at right angles to deliver to the middle shoe when the upper shoe is removed, means for reciprocating the upper and lower shoes, and means for reciprocating the upper shoe from said middle shoe.

3. In a grain cleaner and separator, an upper removable transversely reciprocating screen shoe, a lower longitudinally reciprocating screen shoe, and a hopper normally delivering to said upper shoe and having adjustment vertically and at right angles to deliver to said lower shoe when the upper shoe is removed.

In testimony whereof I affix my signature, in presence of two witnesses.

ALFRED G. PAXTON.

Witnesses:
  WILLIAM E. FLOYD,
  THOMAS J. BUTLER.